United States Patent
Torres

(10) Patent No.: US 11,861,924 B2
(45) Date of Patent: *Jan. 2, 2024

(54) SUPERVISED MACHINE LEARNING ALGORITHM APPLICATION FOR IMAGE CROPPING AND SKEW RECTIFICATION

(71) Applicant: INTUIT INC., Mountain View, CA (US)

(72) Inventor: Terrence J. Torres, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/493,674

(22) Filed: Oct. 4, 2021

(65) Prior Publication Data

US 2022/0027614 A1    Jan. 27, 2022

Related U.S. Application Data

(63) Continuation of application No. 16/265,524, filed on Feb. 1, 2019, now Pat. No. 11,195,005.

(51) Int. Cl.
| | |
|---|---|
| *G06V 30/40* | (2022.01) |
| *G06V 10/24* | (2022.01) |
| *G06T 3/40* | (2006.01) |
| *G06V 30/414* | (2022.01) |
| *G06F 18/21* | (2023.01) |
| *G06V 10/20* | (2022.01) |

(52) U.S. Cl.
CPC .......... *G06V 30/40* (2022.01); *G06F 18/2178* (2023.01); *G06T 3/4007* (2013.01); *G06V 10/243* (2022.01); *G06V 10/255* (2022.01); *G06V 30/414* (2022.01)

(58) Field of Classification Search
None
See application file for complete search history.

(56) References Cited

U.S. PATENT DOCUMENTS

| 8,244,062 B2 | 8/2012 | Dey et al. |
| 11,195,005 B2 * | 12/2021 | Torres ................. G06V 10/243 |
| 2007/0206877 A1 | 9/2007 | Wu et al. |

(Continued)

OTHER PUBLICATIONS

Written Opinion issued in PCT/US2019/043779 dated Oct. 17, 2019.

(Continued)

*Primary Examiner* — Bernard Krasnic
(74) *Attorney, Agent, or Firm* — DLA PIPER LLP (US)

(57) ABSTRACT

Systems and methods here may be used for pre-processing images, including using a computer for receiving a pixelated image of a paper document of an original size, downscaling the received pixelated image, employing a neural network algorithm to the downscaled image to identify four corners of the paper document in the received pixelated image, re-enlarging the downscaled image to the original size, identifying each of four corners of the paper document in the pixelated image, determining a quadrilateral composed of lines that intersect at four angles at the four corners of the paper document in the pixelated image, defining a projective plane of the pixelated image, and determining an inverse transformation of the pixelated image to transform the projective plane quadrilateral into a right angled rectangle.

20 Claims, 6 Drawing Sheets

(56) References Cited

U.S. PATENT DOCUMENTS

| | | |
|---|---|---|
| 2008/0144971 A1 | 6/2008 | Wu et al. |
| 2010/0239165 A1 | 9/2010 | Wu et al. |
| 2013/0230254 A1 | 9/2013 | Wu et al. |
| 2015/0347837 A1 | 12/2015 | Wu et al. |
| 2017/0083762 A1 | 3/2017 | Segalovitz |
| 2019/0362132 A1 | 11/2019 | Zhang |

OTHER PUBLICATIONS

International Search Report issued in PCT/US2019/043779 dated Oct. 17, 2019.

Khurram Javed et al., "Real-Time Document Localization in Natural Images by Recursive Application of CNN", 2017, 14th Annual IAPR International Conference on Document Analysis and Recognition, vol. 1, pp. 105-110, Nov. 9, 2017.

J. Baek, "Fast Document Rectification and Enhancement", Dropbox, Aug. 16, 2016, 11 pages.

C. Dong et al., "Character-Based LSTM-CRF with Radical-Level Features for Chinese Named Entity Recognition", NLPCC-ICCPOL, 2016, pp. 239-250.

Z. Huang et al., "Bidirectional LSTM-CRF Models for Sequence Tagging", arXiv:1508.01991v1, Aug. 9, 2015, 10 pages.

D. Kingma et al., "ADAM: A Methodfor Stochastic Optimization", arXiv:1412.6980v9, Jan. 30, 2017, 15 pages.

B. Lin et al., "Multi-Channel BilSTM-CRF Model for Emerging Named Entity Recognition in Social Media", Proceedings of the 3rd Annual Workshop on Noisy User-Generated Text, Sep. 7, 2017, pp. 160-165.

A. Newell et al., "Stacked Hourglass Networks for Human Pose Estimation", arXiv:1603.06937v2, Jul. 26, 2016, 17 pages.

Y. Pai et al., "Adaptive Thresholding Algoritm: Efficient Computation Technique Based on Intelligent Block Detection for Degraded Document Images", Pattern Recognition, vol. 43, Issue 9, Sep. 10, 2010, pp. 3177-3187.

Sauvola et al., "Adaptive Document Image Binarization", Patter Recognition vol. 33, (2000), pp. 225-236.

Y. Xiong, "Fast and Accurate Document Detection for Scanning", Dropbox, Aug. 9, 2016, 9 pages.

\* cited by examiner

SUPERVISED MACHINE LEARNING ALGORITHM APPLICATION FOR IMAGE CROPPING AND SKEW RECTIFICATION

CROSS-REFERENCE TO RELATED APPLICATIONS

The present application is a continuation of U.S. application Ser. No. 16/265,524, filed Feb. 1, 2019 entitled SUPERVISED MACHINE LEARNING ALGORITHM APPLICATION FOR IMAGE CROPPING AND SKEW RECTIFICATION. The contents of the aforementioned patent application is hereby expressly incorporated by reference in its entirety for all purposes.

DETAILED DESCRIPTION

Figure 1:
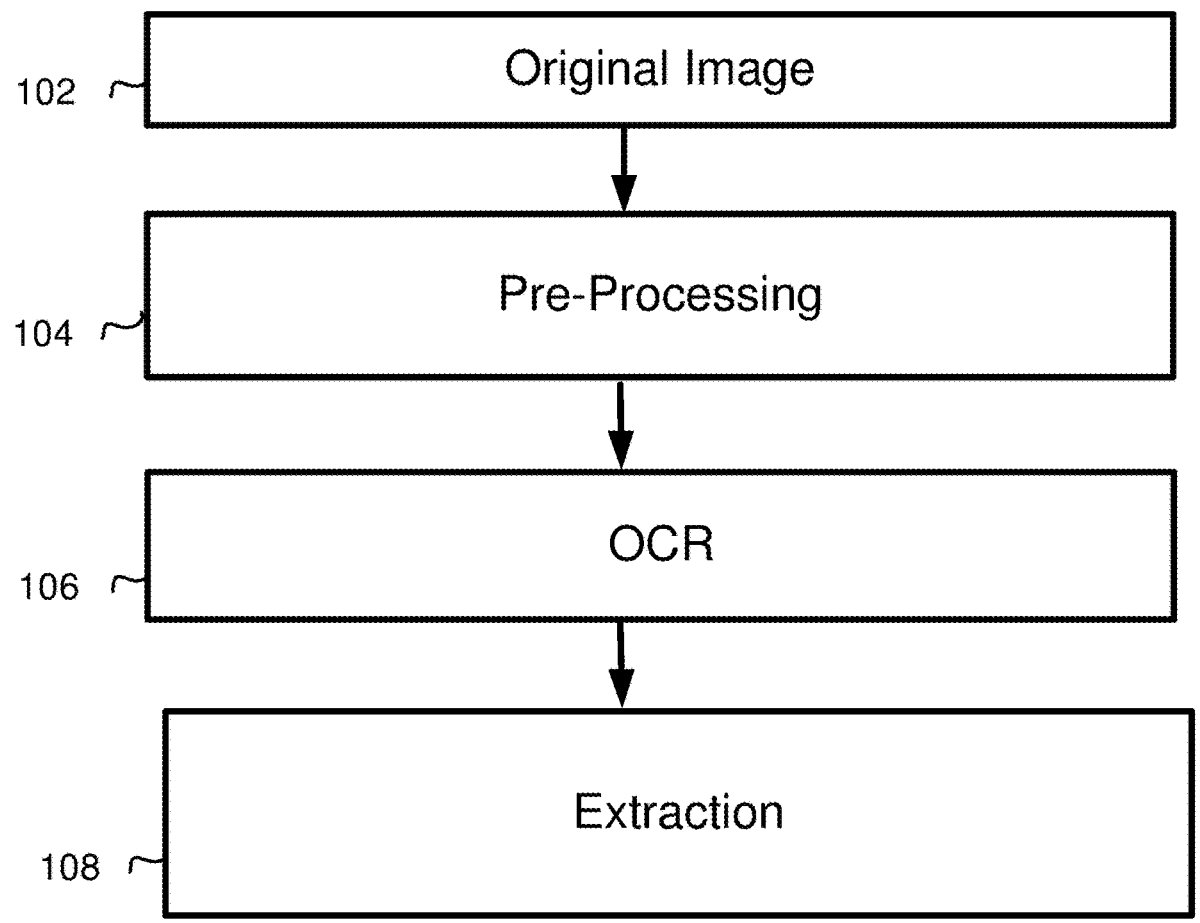
FIG. 1 shows example text capture steps which may be used by the methods and system disclosed herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

This application relates to the field of pixelated image analysis and editing including cropping and skew rectification of document images.

Current image recognition and text alignment techniques struggle to pre-process pixelated images for OCR to produce crisp, clear results, especially for mobile phone type use cases.

Systems and methods here may be used for pre-processing images, including using a computer for receiving a pixelated image of a paper document of an original size, downscaling the received pixelated image, employing a neural network algorithm to the downscaled image to identify four corners of the paper document in the received pixelated image, re-enlarging the downscaled image to the original size, identifying each of four corners of the paper document in the pixelated image, determining a quadrilateral composed of lines that intersect at four angles at the four corners of the paper document in the pixelated image, defining a projective plane of the pixelated image, and determining an inverse transformation of the pixelated image to transform the projective plane quadrilateral into a right angled rectangle.

Overview

In today's world, paper documents such as receipts and tax forms still exist. However, as digitization takes over, it is often useful to turn information found on paper documents into digitized or pixelated text to be stored and manipulated using computerized image capture and storage.

The methods and systems described here include improved ways to pre-process such images to better use OCR to extract data from images taken of paper documents using various de-skewing and cropping techniques. Steps such as these are considered pre-processing of image data which may enhance the effectiveness of later optical character recognition (OCR) of such image data. Pre-processing such as de-skewing and cropping described herein may reduce background interference and align the documents in an image, thereby enhancing any text characters in the images for improved OCR results. Thus, by removing cluttered backgrounds in images and aligning identified text, such text can be more accurately processed using OCR. This may be accomplished by identifying four corners of a document to then de-skew and rotate text within the document as well as eliminate background clutter.

FIG. 1 shows example steps of document understanding that may be accomplished to extract data regarding text from images of paper documents that include such text. First, 102, the original image is captured. Such an original image may be captured using a mobile device. Such images may include noisy content, papers not aligned to the camera, or skewed documents and text. Next, 104 pre-processing the image may be used to improve the accuracy of the eventual text extraction. Pre-processing may include removing background noise, correction of the orientation of the source paper, removal of the background lighting or shadows depicted in the image. Next, 106 OCR may extract all text found in the image. Finally, 108, the extraction may find relevant information, and/or to categorize and extract as values.

Network Examples Including Image Receipt

As discussed, paper documents such as tax forms or paper receipts are found and used in commerce. It would be advantageous to obtain pixelated or digitized copies of such paper records to identify the text on them for processing, storage, or other use. More and more, the easiest way for people to obtain such pixelated or digitized copies is to use a smartphone or mobile device to take a picture of the paper.

Problems may arise, however, in extracting information about the text from such images due to the difficulty of recognizing text found on the paper documents because of various conditions of the original paper source, or the image taking process. For example, an image taken from a smartphone of a paper receipt may not be completely aligned with the camera lens making it difficult for the OCR system to correctly extract the text from the paper. Other photographic noise such as background clutter may be picked up by an OCR system as gibberish text.

Using the methods here, an input such as a first image capture of a paper receipt or form may be pre-processed to enhance the ability to OCR such documents.

Image Capture and Pre-Processing

Figure 2:
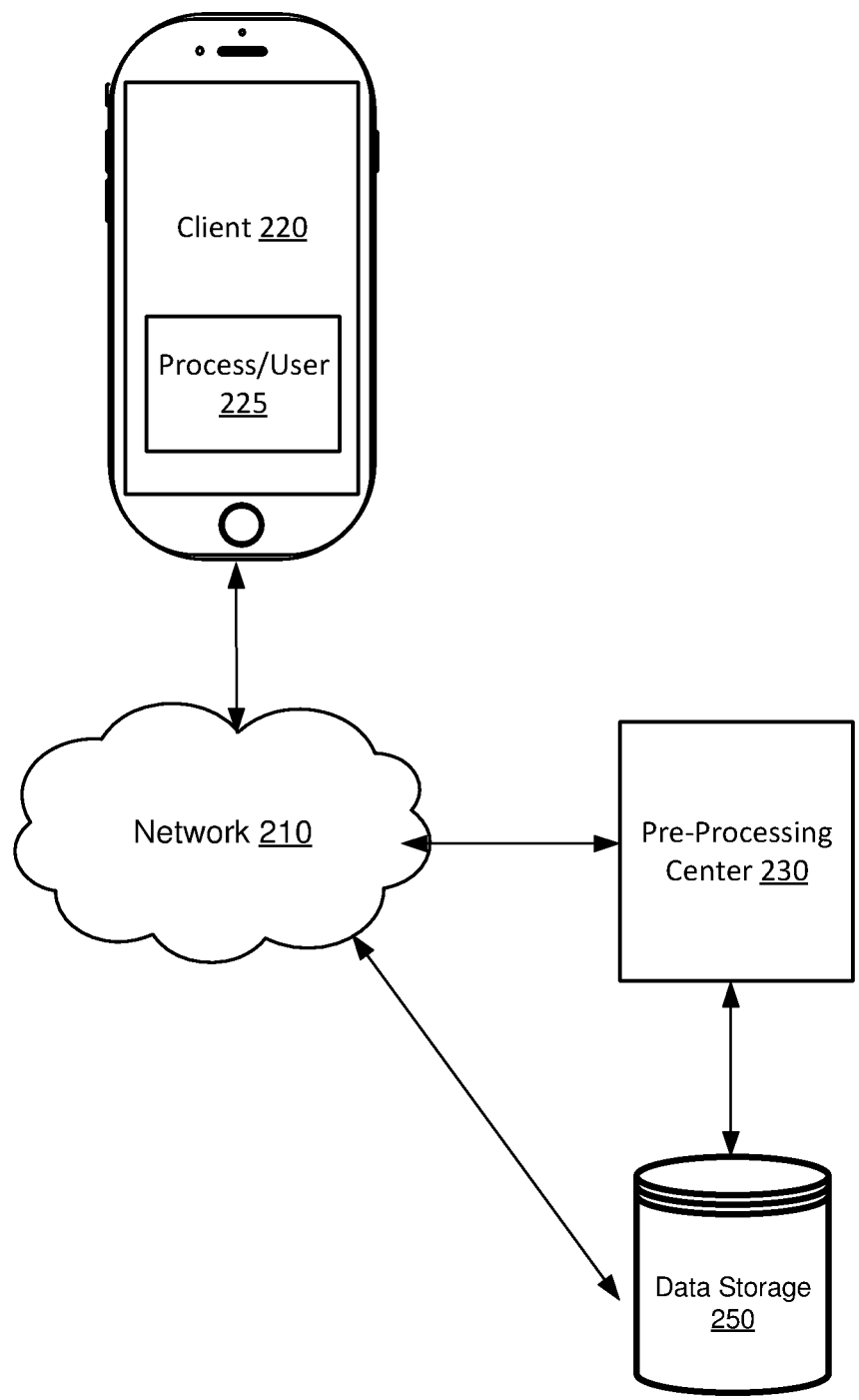
FIG. 2 is a network diagram showing hardware used to execute the example steps as described in the embodiments disclosed herein.

FIG. 2 shows an example network 200 which may be used to practice the methods described herein. Network 200 may include elements such as at least one mobile device, or client 220, pre-processing center 230, and/or at least one data storage 250. In the examples described herein, the mobile client device 220 may be used to capture an image using its associated camera. Image data may then be sent to a pre-processing center 230 by way of a network 210 where the image may be processed and/or stored 250. In some example embodiments, software may reside on the client 220 itself and the pre-processing and/or storage may be conducted on the client 220.

Figure 5:
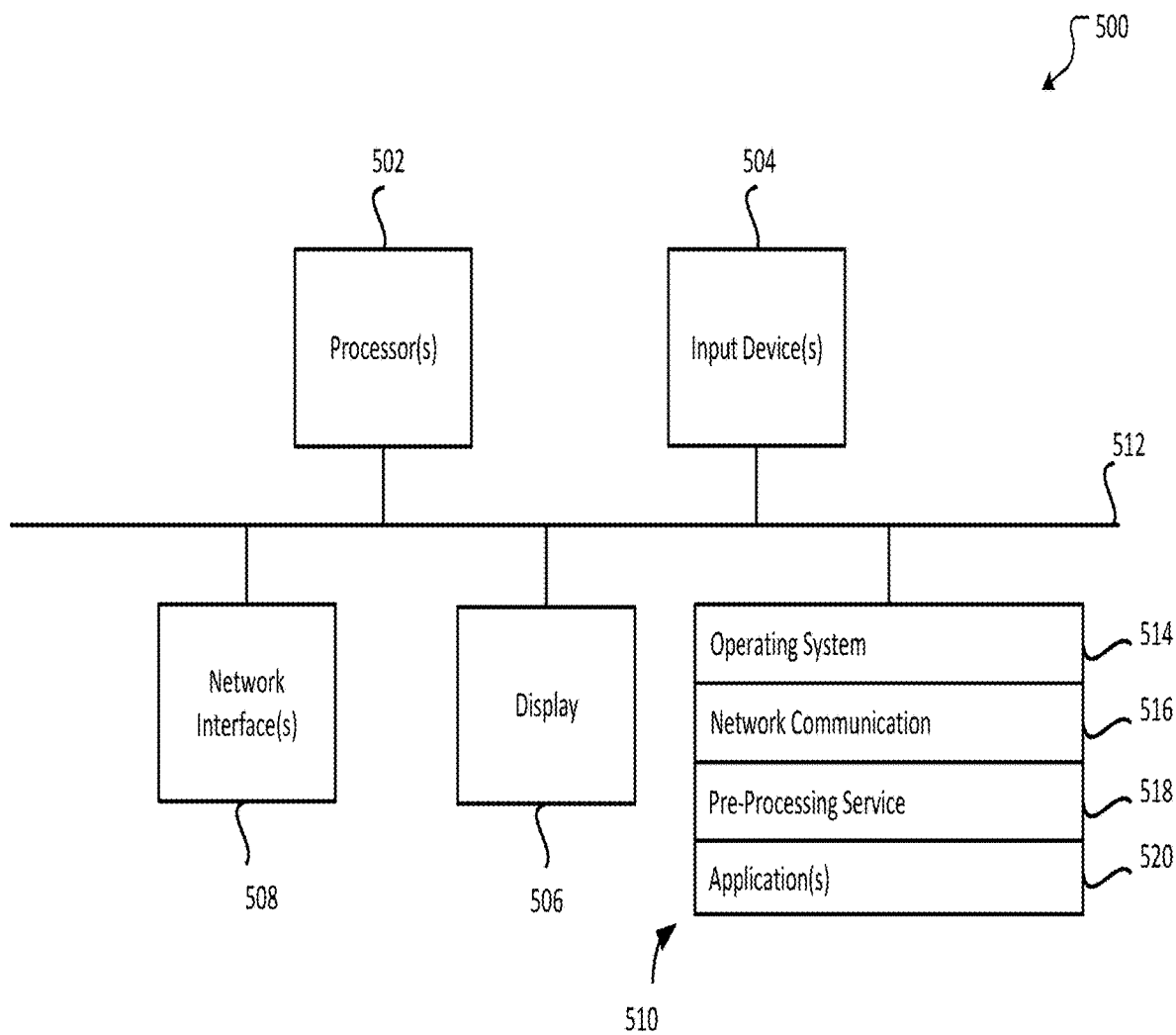
FIG. 5 is an example computing system which may be used in the embodiments disclosed herein.

Each of these elements from FIG. 2 may include one or more physical computing devices (e.g., which may be configured as shown in FIG. 5) distributed computing devices, local computing devices, or any combination of computing devices. In some embodiments, one or more data storages 250 may be provided by the same computing device and/or the same device that provides pre-processing center 230. In some embodiments, client 220 and data storage 250 may be provided by a single computing device. In some embodiments, client 220 may be any device configured to provide access to services. For example, client 220 may be a smartphone, personal computer, tablet, laptop computer, smart watch, smart watch or other wearable, or any other computing device. In some embodiments, data storage 250 may be any device configured to host a service, such as a server or other device or group of devices. In some embodiments, client 220 may be a service running on a device, and may consume other services as a client of those services (e.g., as a client of other service instances, virtual machines, and/or servers).

The elements may communicate with one another through at least one network 210. Network 210 may be the Internet and/or other public or private wired or wireless networks or combinations thereof. For example, in some embodiments, at least data pre-processing center 230, and/or at least one data storage 250 may communicate with one another over secure channels (e.g., one or more TLS/SSL channels). In some embodiments, communication between at least some of the elements of system 200 may be facilitated by one or more application programming interfaces (APIs). APIs of system 200 may be proprietary and/or may be examples available to those of ordinary skill in the art such as Amazon® Web Services (AWS) APIs or the like.

Specific examples of the pre-processing performed by the elements of system 200 in combination with one another are given below. However, the roles of client 220, pre-processing center 230, and data storage 250 may be summarized as follows. Client 220 may acquire an image by use of its associated camera feature(s). Client 220 may then locally store such image data and/or send the image data via the network 210 to the pre-processing center 230 where the pre-processing may take place as described in FIG. 3. In some examples, image data may be stored in local and/or distributed data storage 250.

Client 220, pre-processing center 230 and data storage 250 are each depicted as single devices for ease of illustration, but those of ordinary skill in the art will appreciate that client 220, pre-processing center 230 and/or data storage 250 may be embodied in different forms for different implementations. For example, any of client 220, pre-processing center 230 and/or data storage 250 may include a plurality of devices, may be embodied in a single device or device cluster, and/or subsets thereof may be embodied in a single device or device cluster. A single user may have multiple clients 220, and/or there may be multiple users each having their own client(s) 220. Client(s) 220 may each be associated with a single process 225, a single user 225, or multiple users and/or processes 225. Furthermore, as noted above, network 210 may be a single network or a combination of networks, which may or may not all use similar communication protocols and/or techniques.

Example Images

Figure 3A:
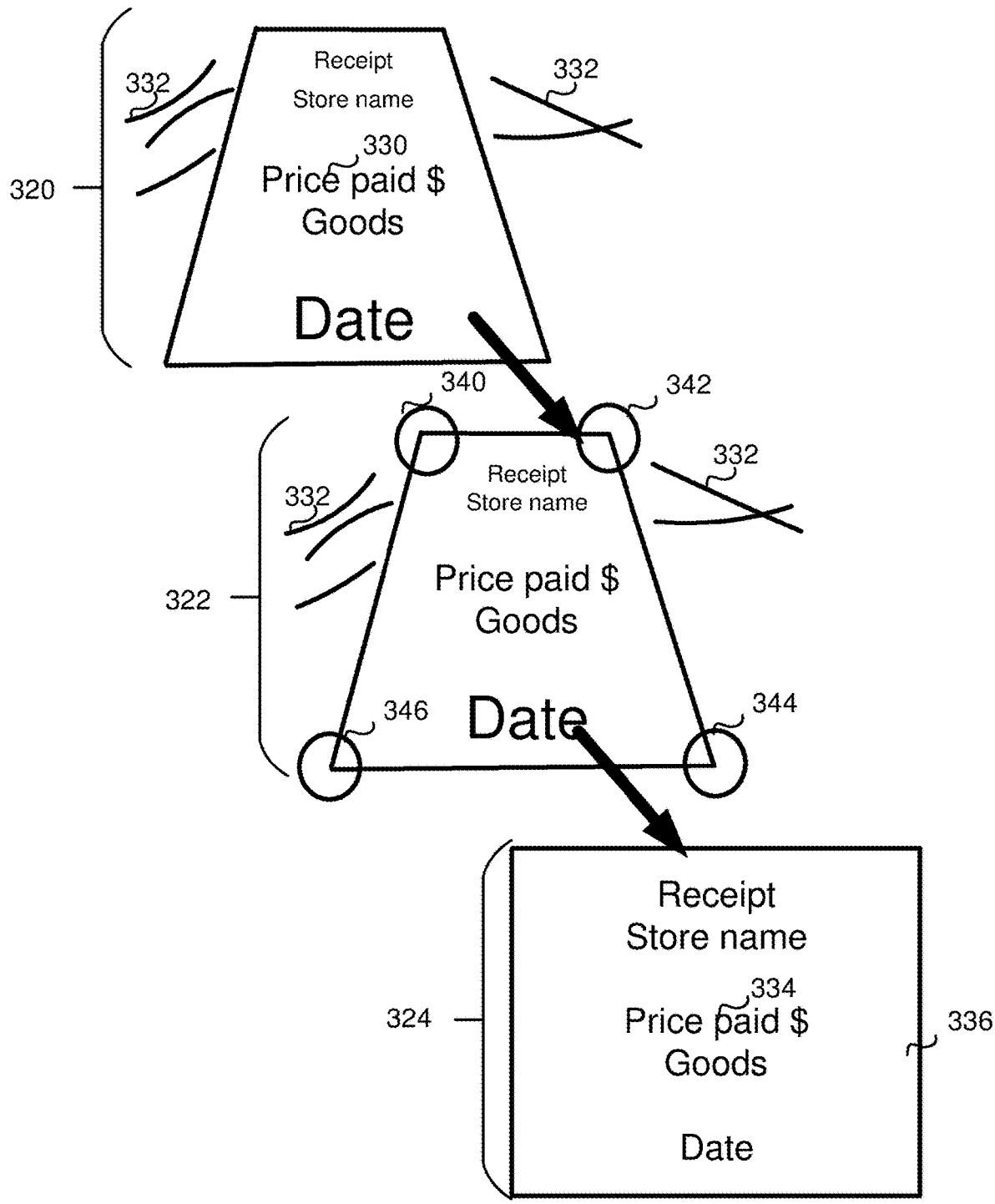
FIG. 3A are diagrams showing corner point identification and perspective transformation example steps as described in the embodiments disclosed herein.

FIG. 3A shows an example of the steps described herein, imparted on one image of a paper receipt. In the example, the receipt is received 320 with a skewed perspective from the angle the original image was captured. It also includes background noise 332 from the table the receipt was sitting on when the image was taken. As received, the text of the receipt 330 may be difficult to process by an OCR system and may be confused by the background clutter.

Using the methods described herein, the four corners 340, 342, 344, 346 of the receipt in the image 322 are first identified. In some example embodiments, the four corners are identified using machine learning/neural networks which have been trained to find such corners. After the corners are identified, the image may be de-skewed to correct any mis-alignment of the text 334 in the document. Additionally or alternatively, after the corners are identified, everything outside the rectangle 324 may be cropped to remove the background noise 332. Such a resultant pixelated or digitized image 336 may be more accurately processed using OCR than the first image 320 with the text aligned and the background removed.

Figure 3B:
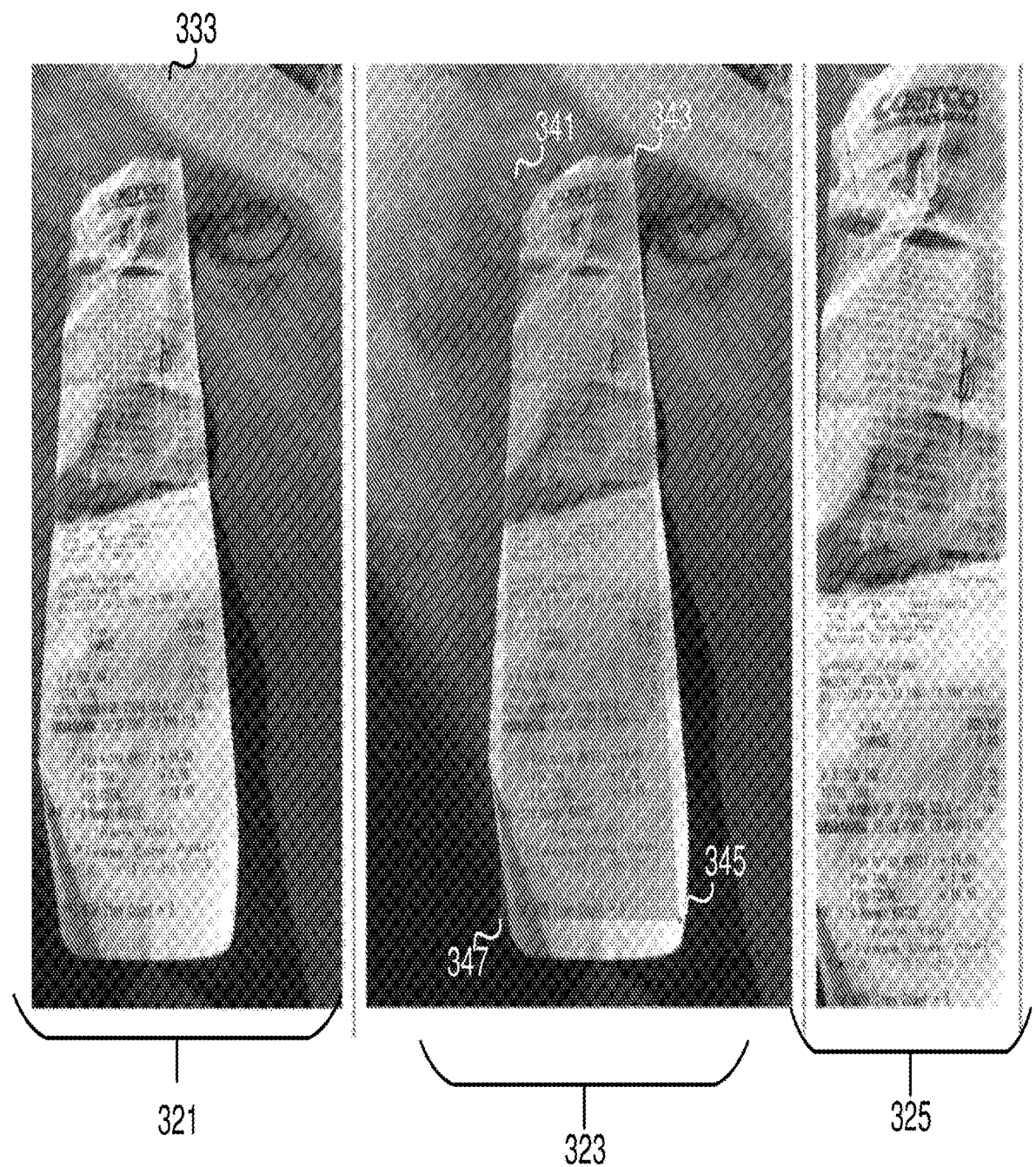
FIG. 3B are diagrams showing more corner point identification and perspective transformation example steps as described in the embodiments disclosed herein.

FIG. 3B shows another example of an original image 321 of a receipt on a noisy background 333. It then shows the receipt 323 corner identification 341, 343, 345, 347, as well as the cropped image 325 accomplished using the steps described herein.

Method Process Step Examples

Figure 4:
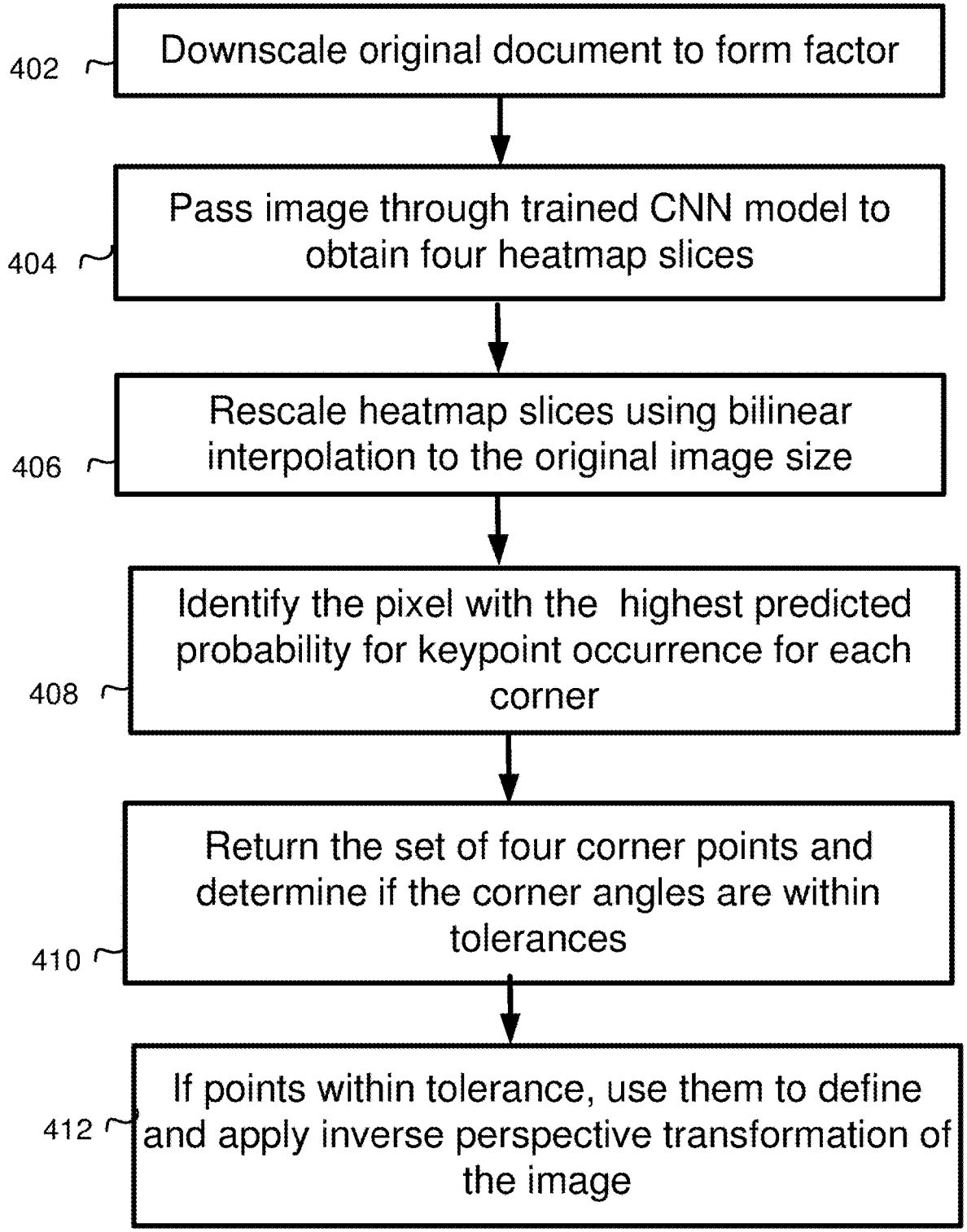
FIG. 4 is a flow chart showing corner point identification and perspective transformation example steps as described in the embodiments disclosed herein.

FIG. 4 explains the example steps used to complete the processes to obtain the results as shown in FIG. 3. In FIG. 4, first, an image is received by the computing system and that image is downscaled 402. In some examples, the image is received from a mobile client or smartphone camera image capture. In some examples, the downscale may be a reduction in pixels by grouping individual pixels to be processed in blocks. This downscale reduces the number of pixels to be processed and thereby increases computing efficiency, reduces the time to process images, and frees up compute resources for other tasks.

Next, the image is passed through a neural network model to obtain four heat map slices 404. This process utilizes neural networks which are trained to identify the four corners of a piece of paper captured in an image. The four heat maps identify the approximate locations of the four corners, as shown in FIG. 3A at 340, 342, 344 and 346 and FIG. 3B 341, 343, 345 and 347.

Next, the heat map slices are rescaled 406. In some examples, this rescaling includes bilinear interpolation to obtain the original size of the image.

Next, the pixel with the highest predicted probability of a keypoint occurrence is identified, for each of the four corners 408. Then a set of the four corner points is returned and the system determines if lines that connect the corners create angles that fall within a pre-determined tolerance, 410. That is, if lines are drawn between the four points, do the line intersections create angles that fall within a tolerance around a ninety degree right angle. If the lines do fall within the tolerance, 412, those corner determinations are used to define a quadrilateral and projective plane from which an inverse transformation of the image may be made in order to de-skew the image. If the lines fall outside the tolerance, the original image is returned. Background, located outside the quadrilateral formed by connecting the corners may be cropped out to remove any background noise or images.

Stacked Hourglass Neural Network

In some example methods described herein, a neural network may be used to create the corner heat maps, and thereby identify the four corners of the document in the image. Such a neural network may be a stacked hourglass neural network arrangement. Such a convolutional neural network (CNN) has been used for human pose prediction in image analysis.[1]

[1] See Stacked Hourglass Networks for Human Pose Estimation, Alejandro Newell, et. al., University of Michigan, Ann Arbor, arXiv:1603.06937v2, 26 Jul. 2016.

In the application described herein, the CNN may be trained to identify the four corners of a document in an image analysis. In such an arrangement, the network may capture and consolidate information across all scales of any given image. This may include first, pooling down the image to a low resolution, then, up-sampling the image to combine features across multiple resolutions. In some examples, multiple hourglass modules may be used back-to-back to allow for repeated bottoms-up, top-down inference across scales. This may utilize a single pipeline with skip layers to preserve spatial information at each resolution and convolution and max pooling layers to process image features down to a low resolution. For each max pooling step, the CNN may branch off and apply more convolutions at the original pre-pooled resolution, so at the lowest resolution, the network begins the top-down sequence of up-sampling and combination of features across scales. Nearest neighbor up-sampling of the lower resolution followed by an element-wise addition of the two sets of features, may be used to bring together information across two adjacent resolutions, thus, for every layer on the way down for downscaling, there is a corresponding layer on the way up for up-sampling. At the output resolution, two consecutive rounds of 1×1 convolutions may be applied to produce the final network predictions. The result may be heat maps of the approximate locations of four corners of the paper document as described. Used with immediate supervision, repeated bidirectional inference may be used for increasing the network's performance.

As described, such a neural network may be trained by introducing iterative examples to identify the four document corners in an image as an upper left, an upper right, a lower left, and lower right corner. Such training may include manual identification of the corners of a paper document capture in an image, and feeding that into the CNN model. For example, training may include using multiple images, for example many thousands images that are manually annotated to include location of the four corner points. Several data augmentation techniques may then be used to achieve greater generalization performance, including random affine transformation as well as in some examples, random background texture sampling.

After the CNN model is trained, a new image may be fed into the model to find the corners. At runtime, the resized document may be 256×256, then the corners identified in the trained stacked-hourglass network. As discussed, the result of such analysis would be four different heat maps that project a probability of the location of each of the four corners. The image may be resized and the resultant point heat map may be resized to the original size image and maximum values may be found to identify the corner point locations. Then a quadrilateral may be formed by connecting the corners, after which, a measurement of the mean vertical and horizontal lengths from the quadrilateral may be made, as defined by the points, to make a projective transformation to transform the quadrilateral into a proper rectangle where the vertical and horizontal dimensions may be previously calculated. That is, the de-skewed image results in a rectangular shaped representation of the paper document, with right angled corners and the resultant text de-skewed.

Example Computing Device

FIG. 5 is a block diagram of an example computing device 500 that may implement various features and processes as described herein. For example, computing device 500 may function as client 220, pre-processing center 230 data storage 250, or a portion or combination of any of these elements. In some embodiments, a single computing device 500 or cluster of computing devices 500 may provide each of pre-processing center 230 data storage 250, or a combination of two or more of these services. Computing device 500 may be implemented on any electronic device that runs software applications derived from instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed across multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad, or display. Bus 512 may be any known internal or external bus technology, including but not limited to ISA, EISA, PCI, PCI Express, NuBus, USB, Serial ATA or FireWire. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Pre-processing service instructions 518 may include instructions that perform the various pre-processing functions as described herein. Pre-processing service instructions 518 may vary depending on whether computing device 500 is functioning as client 220, pre-processing center 230, data storage 250, or a combination thereof.

Application(s) 520 may be an application that uses or implements the processes described herein and/or other processes. The processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, SPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Conclusion

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

The invention claimed is:

1. A method comprising:
   downscaling a pixelated image of a paper document;
   employing a neural network model with the downscaled image to identify four corners of the paper document in the pixelated image, wherein the neural network model generates four heat maps, each heat map predicting a location for each of the four corners;
   determining a quadrilateral that includes the four corners; and
   de-skewing the pixelated image by a projective transformation of the quadrilateral into a right angled rectangle.

2. The method of claim 1, wherein the neural network model comprises a stacked hourglass neural network.

3. The method of claim 1, further comprising:
   cropping a part of the pixelated image outside the right angled rectangle.

4. The method of claim 1, wherein identifying the four corners of the paper document in the pixelated image comprises:
   determining whether an angle at least one corner is within a predetermined tolerance.

5. The method of claim 4, wherein the predetermined tolerance comprises a tolerance boundary based on a ninety degree right angle.

6. The method of claim 1, wherein identifying the four corners of the paper document in the pixelated image comprises:
   identifying, for at least one corner, each pixel with a highest predicted probability of a keypoint occurrence.

7. The method of claim 1, wherein determining the quadrilateral comprises:
   determining the quadrilateral composed of four lines that intersect at four angles at the four corners of the paper document.

8. The method of claim 1, further comprising:
   receiving the pixelated image in an original size from a mobile device through a network, the pixelated image being captured by a camera of the mobile device.

9. The method of claim 8, further comprising:
   re-enlarging the four heat maps of the downscaled image using a bilinear interpolation to obtain the original size.

10. The method of claim 1, further comprising:
    extracting text, using optical character recognition, from the de-skewed pixelated image.

11. A system comprising:
    a processor; and
    a non-transitory storage medium storing computer program instructions, that when executed by the processor, cause the system to perform operations comprising:
       downscaling a pixelated image of a paper document;
       employing a neural network model with the downscaled image to identify four corners of the paper document in the pixelated image, wherein the neural network model generates four heat maps, each heat map predicting a location for each of the four corners;
       determining a quadrilateral that includes the four corners; and
       de-skewing the pixelated image by a projective transformation of the quadrilateral into a right angled rectangle.

12. The system of claim 11, wherein the neural network model comprises a stacked hourglass neural network.

13. The system of claim 11, wherein the operations further comprise:
    cropping a part of the pixelated image outside the right angled rectangle.

14. The system of claim 11, wherein identifying the four corners of the paper document in the pixelated image comprises:
    determining whether an angle at least one corner is within a predetermined tolerance.

15. The system of claim 14, wherein the predetermined tolerance comprises a tolerance boundary based on a ninety degree right angle.

16. The system of claim 11, wherein identifying the four corners of the paper document in the pixelated image comprises:
    identifying, for at least one corner, each pixel with a highest predicted probability of a keypoint occurrence.

17. The system of claim 11, wherein determining the quadrilateral comprises:
    determining the quadrilateral composed of four lines that intersect at four angles at the four corners of the paper document.

18. The system of claim 11, wherein the operations further comprise:
    receiving the pixelated image in an original size from a mobile device through a network, the pixelated image being captured by a camera of the mobile device.

19. The system of claim 18, wherein the operations further comprise:
    re-enlarging the four heat maps of the downscaled image using a bilinear interpolation to obtain the original size.

20. The system of claim 11, wherein the operations further comprise:
    extracting text, using optical character recognition, from the de-skewed pixelated image.

* * * * *